Patented May 16, 1939

2,158,959

UNITED STATES PATENT OFFICE 2,158,959

HYDROXY-ALKYL ETHERS OF TERTIARY-ALKYL PHENOLS

Gerald H. Coleman and John W. Zemba, Midland, Mich., assignors to The Dow Chemical Company, Midland, Mich., a corporation of Michigan No Drawing. Application January 12, 1938, Serial No. 184,561

13 Claims. (Cl. 260—613)

This invention concerns hydroxyl-alkyl ethers of tertiary-alkyl phenol compounds having the formula

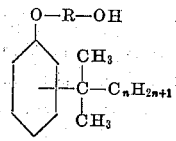

wherein R represents an alkylene group containing from 2 to 4 carbon atoms, inclusive, and $n$ is an integer not greater than 2.

We have prepared members of this class of compounds, determined certain physical characteristics thereof whereby they may be readily identified, and found that they are particularly useful in the preparation of compositions for the control of household insect pests, such as fly sprays.

These new compounds may be prepared by reacting a suitable phenol compound with an halohydrin, e. g. ethylene-bromohydrin, propylene-chlorohydrin, etc., in the presence of a suitable alkali, e. g. NaOH, KOH, etc.

In preparing our new compounds, the phenol may be dissolved in aqueous alkali and the halohydrian added thereto at a reaction temperature with stirring. If desired, however, the reaction may be carried out by first mixing the phenol with the halohydrin and subsequently adding thereto the alkali. While any suitable quantities of reactants may be employed, good yields of the desired products can be obtained when equi-molecular proportions of reactants are used. The reaction may be conveniently carried out at the refluxing temperature of the mixture, but lower or higher temperatures may be employed. In certain cases where the reactants are not readily soluble in aqueous alkali, alcohol or other water-miscible organic solvent may be added to the reaction mixture. Following completion of the reaction the mixture is allowed to stand and separate into layers, the oily layer being subsequently separated, and the desired compound isolated therefrom by fractional distillation under reduced pressure or otherwise.

Other methods by which the compounds may be prepared are: (1) the condensation of the alkylene oxides with suitable tertiary-alkyl phenols, and (2) the etherification of the dihydroxy paraffin hydracarbons with the tertiary-alkyl substituted phenols.

The following examples describe the preparation of certain representative members of our new group of compounds, but are not to be construed as limiting the invention:

Example 1

150 grams (1 mol) of 4-tertiary-butyl phenol and 192 grams (1 mol) of a 42 per cent aqueous azeotrope of ethylene chlorohydrin were mixed together and 133 grams of a 30 per cent aqueous sodium hydroxide solution added thereto over a period of one hour at temperatures gradually increasing from 25° to 42° C. Stirring was maintained for an additional hour after which the reaction batch was allowed to stand for 16 hours at room temperature. An oily layer separated therefrom and was fractionally distilled, whereby 145 grams (0.748 mol) of the beta-hydroxy-ethyl ether of 4-tertiary-butyl phenol was obtained as a water-white oil boiling at 126.5–127.5° C. at 4 millimeters pressure, freezing at approximately 15° C. and having a specific gravity of 1.015 at 20°/4° C. This compound was substantially insoluble in water but somewhat soluble in most organic solvents.

Example 2

1 mol of 4-tertiary-amyl phenol, 1 mol of sodium hydroxide, and 2.5 mols of water were mixed together and 192 grams of a 42 per cent aqueous azeotrope of ethylene chlorohydrin reacted therewith substantially as described above. The resulting oily layer was fractionated, whereby there was obtained 0.35 mol of the beta-hydroxy-ethyl ether of 4-tertiary-amyl phenol. This compound is a water-white liquid boiling at 145°–148° C. at 4 millimeters pressure, and having a specific gravity of 1.0045 at 20°/4° C.

Example 3

2 mols of 4-tertiary-butyl phenol, 2 mols of sodium hydroxide, and 400 milliliters of water were mixed together, and 2 mols of propylene chlorohydrin in the form of a 51 per cent aqueous azeotrope gradually added thereto over a period of 2 hours and at temperatures gradually increasing from 79° to 96.5° C. The reaction mixture was refluxed for a short time after the addition of the chlorohydrin, cooled, acidified, and the resulting oil separated therefrom. The latter was washed with water and distilled whereby there was obtained 1.4 mols of the hydroxy-propyl ether of 4-tertiary-butyl phenol as a white crystalline solid, melting at 45° C., and boiling at 150°–155° C. at 10 millimeters pressure.

Example 4

In a similar manner 2-tertiary-butyl phenol was reacted with sodium hydroxide and ethylene chlorohydrin whereby there was obtained the beta-hydroxy-ethyl ether of 2-tertiary-butyl phenol, a water-white liquid boiling at 110°–113° C. at 4 millimeters pressure, freezing at approximately −17.5° C., and having a specific gravity of 1.021 at 20°/4° C.

Among other hydroxy-alkyl ethers which may be prepared by substituting other tertiary-alkyl substituted phenol compounds for those shown in the examples are beta-hydroxy-ethyl ether of 3-tertiary-butyl phenol, beta-hydroxy-ethyl ether of 2-tertiary-amyl phenol, beta-hydroxy-ethyl ether of 3-tertiary-amyl phenol, hydroxy-propyl ether of 2-tertiary-amyl phenol, hydroxy-propyl ether of 3-tertiary-butyl phenol, hydroxy-propyl ether of 4-tertiary-amyl phenol, hydroxy-butyl ether of 4-tertiary-butyl phenol, hydroxy-butyl ether of 4-tertiary-amyl phenol, etc.

Certain of the compounds described in the foregoing examples have been tested by the Peet-Grady method (Soap, 8, No. 4, 1932) and found to be particularly valuable as fly spray toxics. For example, a 3 per cent solution of beta-hydroxy-ethyl ether of 4-tertiary-butyl phenol in kerosene, when tested against house flies, was found to give in excess of a 90 per cent knockdown and an average kill of over 45 per cent in 24 hours. A 3 per cent solution of beta-hydroxy-ethyl ether of 4-tertiary-amyl phenol in kerosene killed approximately 45 per cent of house flies contacted therewith when tested in a similar manner. Likewise, the hydroxy-propyl ether of 4-tertiary-butyl phenol was found to kill approximately 30 per cent of house flies contacted therewith.

This application is a continuation-in-part of our co-pending application Serial Number 127,177, filed February 23, 1937.

Other modes of applying the principle of our invention may be employed instead of those explained, change being made as regards the materials employed provided the products described in the following claims be thereby obtained.

We therefore particularly point out and distinctly claim as our invention:

1. A compound having the formula

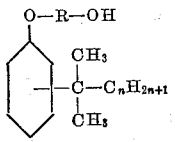

wherein R represents an alkylene group containing from 2 to 4 carbon atoms, inclusive, and $n$ is an integer not greater than 2.

2. A compound having the formula

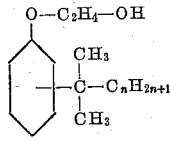

wherein $n$ is an integer not greater than 2.

3. A compound having the formula

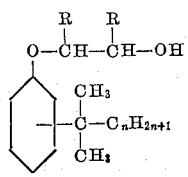

wherein $n$ is an integer not greater than 2, one R represents hydrogen, and the other R represents a member of the group consisting of methyl and hydrogen.

4. A compound having the formula

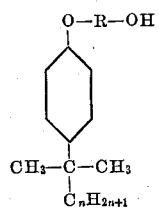

wherein R represents an alkylene group containing from 2 to 4 carbon atoms, inclusive, and $n$ is an integer not greater than 2.

5. A compound having the formula

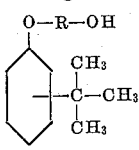

wherein R represents an alkylene group containing from 2 to 4 carbon atoms, inclusive.

6. A compound having the formula

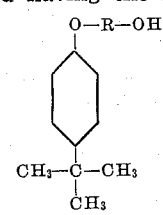

wherein R represents an alkylene radical containing from 2 to 4 carbon atoms, inclusive.

7. A compound having the formula

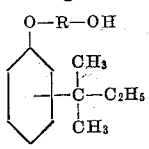

wherein R represents an alkaylene group containing from 2 to 4 carbon atoms, inclusive.

8. A compound having the formula

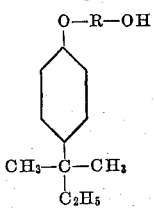

wherein R represents an alkylene radical containing from 2 to 4 carbon atoms, inclusive.

9. A beta-hydroxy-ethyl ether of tertiary-butyl phenol.

10. A beta-hydroxy-ethyl ether of tertiary-amyl phenol.

11. The beta-hydroxy-ethyl ether of 4-tertiary-butyl phenol.

12. The beta-hydroxy-ethyl ether of 4-tertiary-amyl phenol.

13. The hydroxy-propyl ether of 4-tertiary-butyl phenol.

GERALD H. COLEMAN.
JOHN W. ZEMBA.